United States Patent [19]

Sanner

[11] 3,915,185
[45] Oct. 28, 1975

[54] CONTROL UNITS FOR FLOW CONTROL SYSTEMS

[75] Inventor: George E. Sanner, Sparks, Md.

[73] Assignee: Santron Corporation, Towson, Md.

[22] Filed: May 3, 1974

[21] Appl. No.: 466,693

Related U.S. Application Data

[60] Continuation-in-part of Ser. No. 272,793, July 18, 1972, Pat. No. 3,848,616, which is a continuation-in-part of Ser. No. 18,829, Feb. 12, 1970, abandoned, which is a division of Ser. No. 456,787, May 18, 1965, Pat. No. 3,500,844.

[52] U.S. Cl. ............ 137/78; 137/377; 137/624.15; 239/63
[51] Int. Cl.² ......................................... A01G 25/16
[58] Field of Search............ 137/78, 624.11, 624.12, 137/624.13, 624.15, 377, 382, 624.16, 624.17; 239/63, 64, 70; 251/367

[56] References Cited
UNITED STATES PATENTS

| | | | |
|---|---|---|---|
| 2,192,578 | 3/1940 | Michaels | 137/624.11 |
| 2,599,862 | 6/1952 | Ray | 137/78 X |
| 2,754,150 | 7/1956 | Edelman | 137/78 X |
| 3,118,606 | 1/1964 | Rotunda | 239/63 |
| 3,283,781 | 11/1966 | Boyer | 137/624.17 |
| 3,483,673 | 12/1969 | Wellman | 137/624.13 X |
| 3,672,391 | 6/1972 | Livingston et al. | 137/624.15 X |

Primary Examiner—Martin P. Schwadron
Assistant Examiner—Richard Gerard
Attorney, Agent, or Firm—Strauch, Nolan, Neale, Nies & Kurz

[57] ABSTRACT

Control units for lawn sprinkling and other fluid flow systems which include a casing and, in the interior of the casing, a solenoid-operated flow control valve and electrical circuitry for controlling the operation of the valve. Externally accessible connections are provided for fluid supply and distribution conduits and may be provided for options such as rain switches and alarms, soil moisture probes, additional flow control valves, booster pumps, and other flow controlling and effecting devices.

9 Claims, 7 Drawing Figures

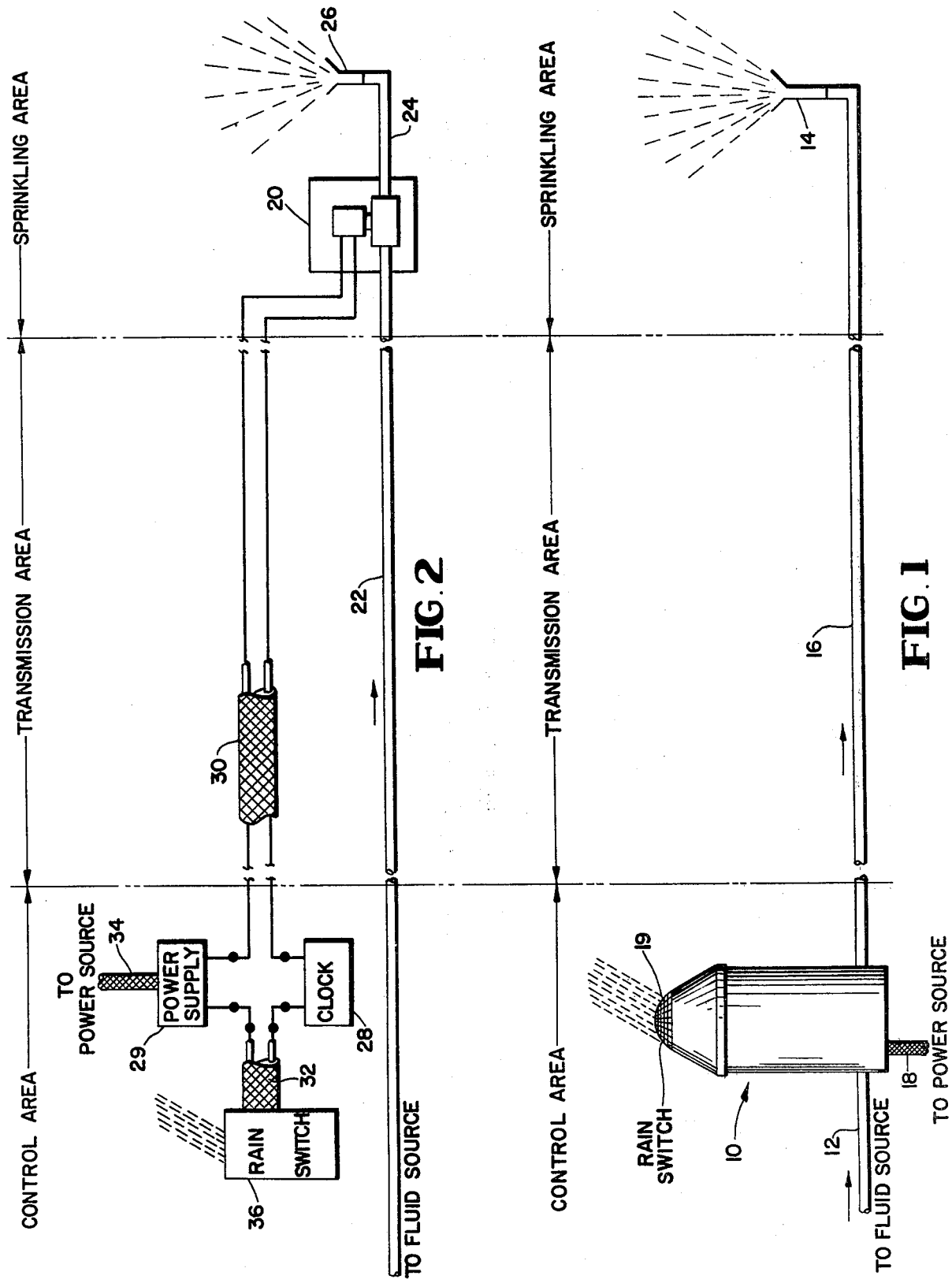

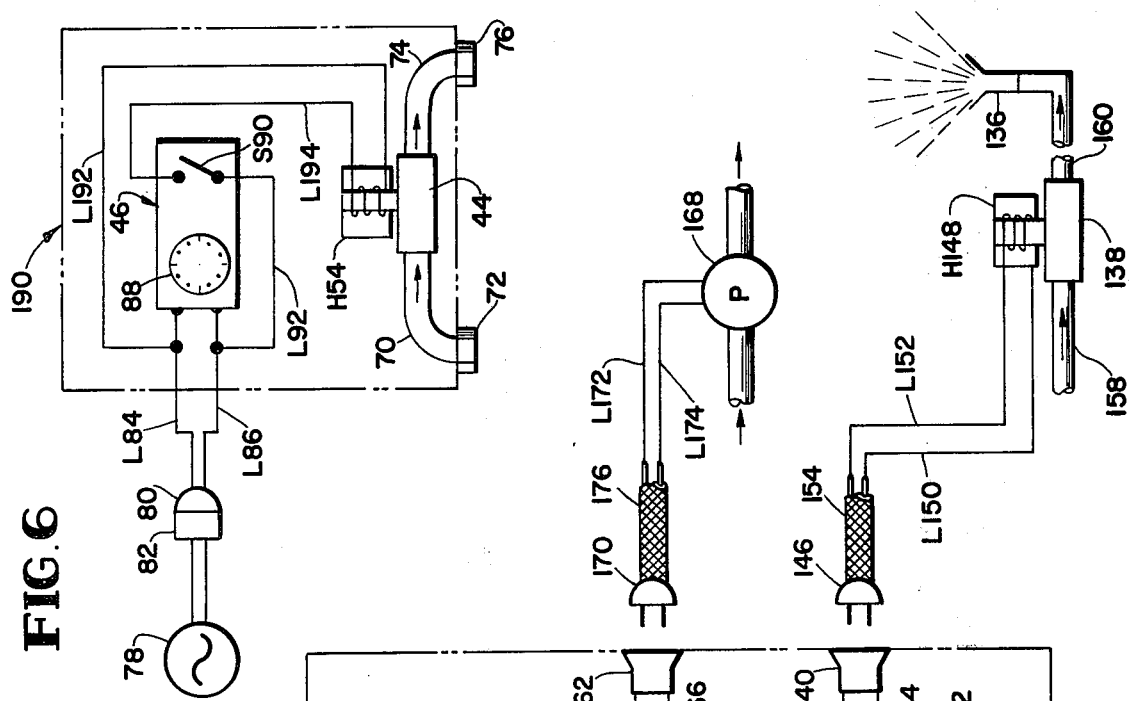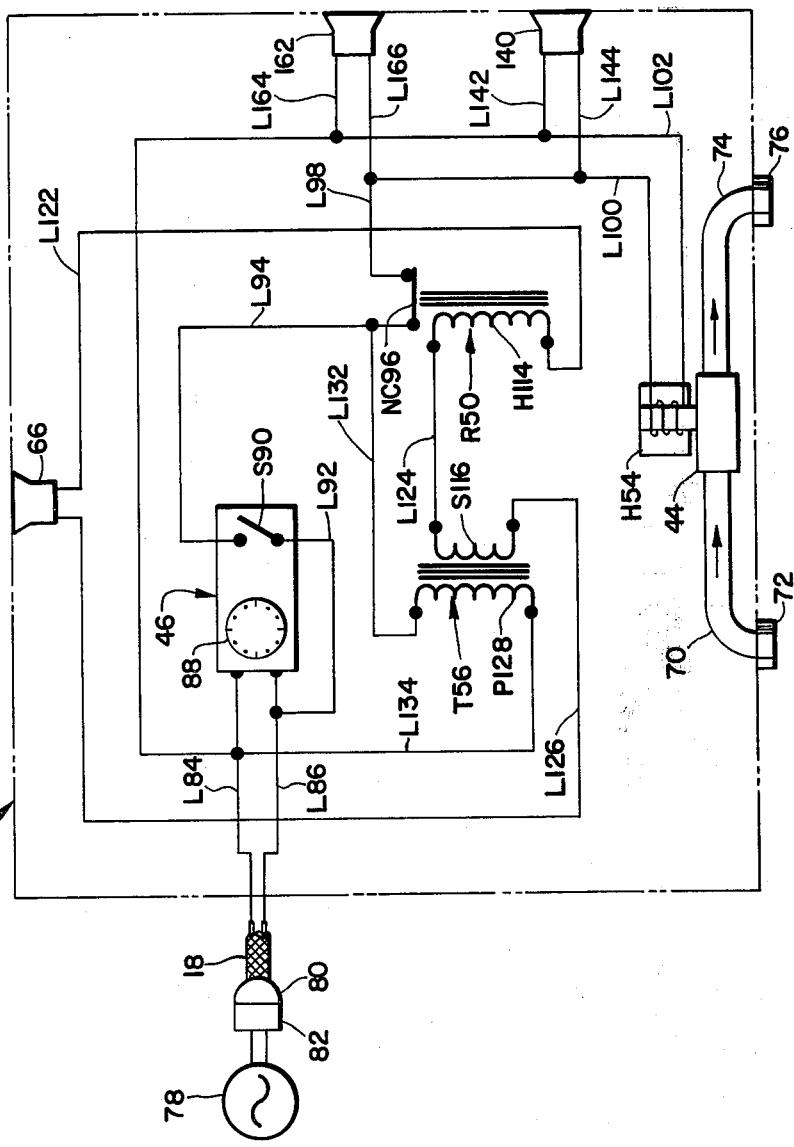

CONTROL UNITS FOR FLOW CONTROL SYSTEMS

This application is a continuation-in-part of application Ser. No. 272,793 filed July 18, 1972, now U.S. Pat. 3,848,616. The latter is a continuation-in-part of application ser. No. 18,829 filed Feb. 12, 1970 (now abandoned), which is a division of application Ser. No. 456,787 filed May 18, 1965 (now U.S. Pat. No. 3,500,844).

The present invention relates to fluid flow control systems and, more specifically, primarily to novel, improved, self-contained fluid flow control units for lawn sprinkling and other fluid flow systems.

Several different types of control units for lawn sprinkling and comparable fluid flow systems have heretofore been proposed. One type includes a mechanical timer and a valve housed in an appropriate casing provided with connections for fluid inflow and outflow conduits. Exemplary control units of this character are disclosed in U.S. Pat. Nos. 1,085,012 issued Jan. 20, 1914, to Bopp; 1,179,863 issued Apr. 18, 1916, to Phillips; 1,484,126 issued Feb. 19, 1924, to Gaspard; 1,929,455 issued Oct. 10, 1933, to Smith; 2,629,437 issued Feb. 24, 1953, to Weeks; 2,719,538 issued Oct. 4, 1955, to Cole; 2,768,683 issued Oct. 20, 1956, to DeSchane; and 2,852,072 issued Sept. 16, 1958, to Alfrey.

The last four of the patents just listed disclose control units of the currently marketed, so-called "waterboy" type. The control unit is attached directly to a faucet and connected by a hose to a sprinkler. The mechanical timer of the unit is set, opening the control unit valve, and the faucet opened. Water flows to the sprinkler until the timer runs down (usually 30–90 minutes). The control unit valve then closes and remains so until the timer is manually reset.

Control units of the type just described have a number of disadvantages.

One of these is that the timer must be manually reset for each flow control cycle.

Also, this type of control lacks versatility. The period over which the timer can exercise control is limited; and, more important, such units cannot be provided with auxiliary controls.

For example, it is often desirable to make provision in a lawn sprinkling system for interrupting the sprinkling during periods of rainfall. Modification of a mechanical timer to function in this manner is impractical economically if not technically.

Also, control units of the character just described are not capable of being modified to control remotely located options such as flow control valves, pumps, etc.

Another disadvantage of fluid flow control units with mechanical timers is that the dust and moisture encountered in outdoor operation can cause failures or unreliable operation.

Fluid flow system controls with electric, clock-type timers have also been proposed. Representative controllers of this type are disclosed in U.S. Pat. Nos. 2,599,862 issued June 10, 1952, to Ray; 2,754,150 issued July 10, 1956, to Edelman; 2,864,650 issued Dec. 16, 1958, to Delamater; and 3,212,714 issued Oct. 19, 1965, to Davis.

These controllers have the advantage over mechanical timed controllers that the timing cycle is automatically repetitive. Therefore, the timer need not be reset for each watering or other flow cycle. However, the controllers with electric, clock-type timers heretofore proposed have disadvantages which are equally, if not more, serious than those appurtenant to controllers with mechanical timers.

As shown by the patents last mentioned above, flow system controllers with electrically-operated timers as heretofore envisioned typically include, in addition to the unit in which the timer is housed, a remotely disposed solenoid valve and a control device such as a soil moisture probe or a rain switch. The solenoid valve and the control device are both connected by external electrical lines to the timer unit which is connected, also by external conductors, to an electrical power source.

The plural and typically lengthy external electrical lines between the system components make the heretofore proposed controllers of the type just described complex and expensive. Installation costs are also high because they must be installed by persons with expertise not possessed by the typical homeowner and the electrical conduits must be buried, suspended, etc. to keep them from being safety hazards. As a practical matter, this requirement also limits such controllers to use in permanent installations; it is not feasible to move the system from location-to-location.

Like the controllers with mechanical timers, those just described are also typically lacking in versatility. Their design does not lend itself to the addition of control devices other than those with which they are initially designed.

I have now designed novel control units for lawn sprinkling and other fluid flow systems which are free of the disadvantages discussed above and which have other advantages as well.

In their simplest versions my novel fluid flow system control units include a casing in which a solenoid-operated valve and all of the controls essential for the operation of the valve can be housed. The only connections to the unit are one for connecting the electrical components of the unit to a power source, fluid inlet and outlet connections, and, optionally, circuit connections for auxiliary control devices responsive to parameters such as precipitation, pressure, humidity level, etc. and for other flow controlling and/or effecting devices such as pumps and remotely located valves.

One of the important advantages of the controllers just described is that all of the electrical components necessary for flow control can be integrated into a single, portable unit with only one external electrical connection.

This makes the system compact. And it can be readily moved from place to place and installed when and where it is needed.

The control system is simple and inexpensive to manufacture. Installation can be accomplished quickly and without special skills or tools as this typically involves only connecting hoses to the fluid couplings of the unit and plugging its power cable into a socket or jack.

Another important advantage of my novel flow control as described above is that it poses much less of a safety problem than electrically operated flow controls such as those described above, both during installation and operation because only one external electrical line is required. This line can be very short if the control is located near an outlet or other electrical power source. This virtually eliminates the electrical shock hazard.

The entire control unit can be heremetically sealed. This, together with the simplicity of the system, makes the unit exceptionally reliable. The hermetically sealed casing also contributes to the low cost of the system as it renders unnecessary the use of shields and the like to protect the components of the unit against dust and moisture.

Another important advantage of the control units I have invented is their versatility. Auxiliary control devices such as soil moisture detectors, rain switches, etc. and auxiliary flow devices such as booster pumps, additional solenoid-operated valves, etc. can be added by plugging them into sockets or jacks opening onto the exterior of the control unit casing. No access to the interior of the control unit casing is required which will be appreciated as a decided benefit by those conversant in the arts to which the present invention relates.

Another important advantage of my novel control units is that the operating cycle is repetitive. This makes them superior to those which have mechanical timers and must accordingly be manually reset after each operating cycle.

The feature just discussed also distinguishes my novel units from flow control systems such as that shown in U.S. Pat. No. 2,651,361 issued Sept. 8, 1953, to Smith. Smith's controller employs a one-shot timer that requires resetting between operating cycles. Also, the Smith mechanism is too complex for the applications for which my novel control units are intended; and it lacks the versatility of my flow controls in that the addition of auxiliary control and flow devices to the illustrated system would be impractical.

From the foregoing it will be apparent to the reader that one important object of the invention resides in the provision of novel, improved apparatus for controlling flow in lawn sprinkling and other fluid flow systems.

Other important but more specific objects of the invention reside in the provision of fluid flow system controls:

1. which are simple and compact;
2. which, in conjunction with the preceding object, are of a unitary construction, all of the components being housed in a single casing which can be hermetically sealed to keep foreign substances out;
3. which are portable and can be readily moved from place to place;
4. which are comparatively inexpensive to manufacture;
5. which are highly reliable in operation;
6. which can be installed easily and quickly and without the exercise of special skills or the use of special tools;
7. which are safe to operate and to install;
8. which, in conjunction with the preceding object, are characterized by a minimum of exposed electrical lines;
9. which have a high degree of versatility;
10. in which, in conjunction with the preceding object, provision is made for easily and quickly adding auxiliary flow and/or control devices to the basic controls;
11. which have a repetitive operating cycle and can therefore operate on a repeating basis without manual reset;
12. which have various combinations of the foregoing attributes.

Other important objects and features and additional advantages of the invention will become apparent from the appended claims and as the ensuing detailed description and discussion proceeds in conjunction with the accompanying drawing, in which:

FIG. 1 is a diagrammatic illustration of a fluid flow system with an electrically operated flow control in accord with the principles of the present invention;

FIG. 2 is a similar view of a prior art fluid flow control system;

FIG. 4 is a circuit diagram for the control unit of FIG. 3;

FIG. 6 shows an alternate valve operating control arrangement for control units in accord with the principles of the present invention.

Figure 3:
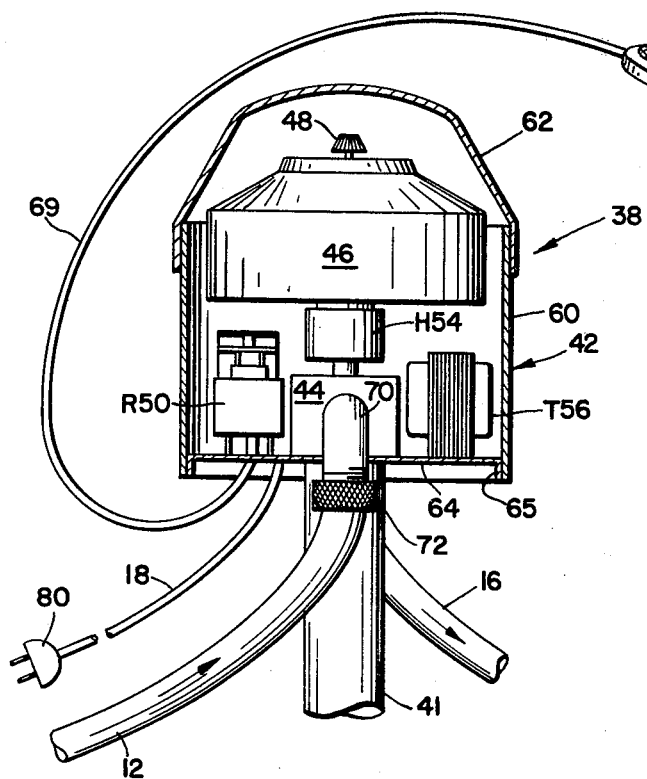
FIG. 3 is an elevation of a fluid flow control unit in accord with the principles of the present invention, the casing of the unit being broken away to show its internal components.

Referring now to the drawing, FIG. 1 depicts a lawn sprinkling system including a fluid flow control unit 10 constructed in accord with the principles of the present invention. The control unit is connected to a fluid source (not shown) by conduit 12, to a sprinkler head 14 by conduit 16, and to a power source (also not shown) by external power cable 18. All of the components required for controlling the flow of fluid through conduits 12 and 16 to sprinkler 14 are located in control unit 10 with the exception of an optional rain switch 19 mounted on top the control unit. The rain switch will typically be provided so that the flow of fluid to sprinkler 14 can be terminated during periods of natural precipitation.

FIG. 1 makes it apparent that the control unit is a compact package of a character which can be readily moved from place-to-place and that the single electrical cable 18 can be made of minimal length by locating control unit 10 near a socket or other power source. As discussed above, this is important from the safety viewpoint.

This novel system just described is completely different conceptually from heretofore proposed, electrically operated, lawn sprinkling systems. As shown in FIG. 2, the latter typically include a remotely located, solenoid-operated valve 20 for controlling the flow of fluid through conduits 22 and 24 to sprinkler 26; a clock type timer 28 and a power supply 29 for controlling the operation of valve 20; and external cables 30, 32, and 34 for connecting the timer to valve 20 and to a rain switch 36 and for connecting power supply 29 to an electrical power source.

Because of the larger number of external electrical cables and because they may be quite long, the prior art system shown in FIG. 2 poses a much greater safety hazard than the novel system shown in FIG. 1. Furthermore, installation of the system is complicated and permanent and will invariably require the services of an electrician and a plumber at the minimum.

Additionally, my novel system simplifies conduit mechanization in the transmission areas as shown in FIGS. 1 and 2. Prior systems (FIG. 2) have required both electrical and fluid conduits to pass through the transmission area, while the unique system of FIG. 1 requires only fluid conduction therethrough.

Furthermore, in systems of conventional design such as shown in FIG. 2, the power cable 30 is generally required to carry low voltage for safety purposes. As the basic requirements of lawn sprinkling almost always results in wide separation of sprinkler 26 from the control area, the transmission area requires long lengths of cable; and a significant voltage drop can occur. In order to effectively operate solenoid valve 20, large currents are therefore required. This can lead to safety problems resulting from $I^2R$ losses in the cable causing temperature increases in the transmission area.

Referring again to the drawing, FIG. 3 depicts a fluid flow control unit 38 in accord with the principles of the present invention which may be employed as illustrated in FIG. 1 but which is shown in association with a detachable rain switch S40 rather than one permanently mounted on the control unit casing.

Control unit 38, in this case designed to be mounted on a stanchion 41, includes a casing 42 housing a solenoid-operated valve 44 through which the fluid being controlled flows. Also housed in casing 42 is the system for operating (i.e., opening and closing) valve 44.

Among the major components of this system are a clock type timer 46 having a setting knob 48 and a rain switch relay R50. This relay is energized by the closing of rain switch S40 to interrupt the flow of current to the solenoid or actuator H54 of valve 44 during periods of natural precipitation. This causes the valve to close.

Casing 42 also houses a stepdown transformer T56. Rain switch S40 is connected into the secondary circuit of the transformer in a manner which will be discussed presently and therefore has only a low voltage at its terminals. This is another feature of the invention from the safety viewpoint.

Casing 42 includes a cylindrical main member 60; a frustoconical upper cover 62, which is telescoped over the main casing member to keep moisture from penetrating through the joint between these two members; and a circular lower or bottom cover 64 with a depending flange 65. Cover 64 is fitted into the lower end of the main casing member.[1]

[1]. As shown in FIG. 3, all internal control unit components are mounted on or supported from bottom cover 64; and all external electrical and fluid connections are made through this cover. As will be appreciated by those conversant in the fields to which my invention is related, this novel arrangement has obvious advantages from a manufacturing viewpoint as it permits the entire unit to be assembled on the bottom cover followed by the addition of casing members 60 and 62.

Power cable 18 extends to the exterior of casing 42 through bottom cover 64.

Turning now to both FIGS. 3 and 4, a socket, jack, or similar electrical connector 66 is located (typically in an aperture in bottom cover member 64) where it will be accessible from the exterior of the casing. This permits rain switch S40 to be electrically coupled to the electrical components in casing 42 by mechanically engaging a plug or similar, cooperating connector 68 on the end of external, low voltage cable 69 with connector 66.[2]

[2]. If desired, the external power cable 18 can be dispensed with and this same scheme employed to connect a detachable external power cable to control unit 38. Access to the interior of the casing to connect the rain switch is consequently not required.

The fluid supply and distribution or delivery conduits 12 and 16 may also be connected to control unit 38 without gaining access to the interior of casing 42. The inlet or supply side of valve 44 is connected by a conduit 70 extending through bottom cover 64 to a conventional coupling or fitting 72 located adjacent the outer side of the bottom cover. The outlet or delivery side of the valve is similarly connected by a conduit 74 to an externally located and accessible coupling or fitting 76. Cooperating fittings (not shown) on the ends of conduits 12 and 16 at the control unit are threaded onto or into or otherwise attached to couplings 72 and 76 to make the fluid connections.

The openings around the various apertures in the casing and between the casing members can be sealed by a number of techniques which are conventional and will accordingly not be described herein. This permits the entire casing to be hermetically sealed after the internal components are installed because, as will be apparent from the preceding discussion, access to the interior of the casing is not required thereafter to make either the fluid or electrical connections to the control unit. Hermetic sealing of casing 42 is an important and novel feature in that it keeps moisture, dust, and other foreign substances from penetrating to the interior of the casing, thereby ensuring the reliability of operation and a long service life.

Referring now specifically to FIG. 4, the voltage present at the power source 78 to which control unit 38 will typically be connected by cable 18, plug 80, and socket 82 (ordinarily, 110–120 volt, 60 cycle, A.C.) is applied through conductors L84 and L86 in cable 18 to the terminals of timer 46. This timer may be of a conventional type including a 24 or 48 hour clock 88 provided with trips (not shown) adapted to open and close a timer switch or contact S90 one or more times during each 24 or 48 hour period.

With timer contact S90 closed, operating voltage is applied from source 78 through leads L86 and L92, the timer contact, lead L94, the normally closed contact NC96 of relay R50, and leads L98 and L100 to one side of the solenoid actuator H54 of valve 44. The opposite side of the actuator is connected by leads L102 and L84 to voltage source 78.

Therefore, when timer switch S90 closes, actuator H54 is connected across voltage source 78, energizing the actuator and opening valve 44. This permits fluid to flow from conduit 12 through valve 44 and into conduit 16 to sprinkler 14 (see FIGS. 1 and 3). Consequently, as long as timer contact S90 remains closed, sprinkling will occur.

By adjusting the timer trips with control 48, the duration of this period and the time at which it starts can be adjusted. Because the manner in which this is done is well known and as a number of suitable timers are commercially available, a detailed description of timer 46 is not believed necessary and will consequently not be included herein.

It is the function of rain switch S40 to modify the timer operation just described in such a manner that, during periods of natural rainfall, the continuity of the circuits to actuator H54 will be interrupted and valve 44 closed, even though timer contact S90 may be closed to complete the actuator energizing circuit described above.

Rain switch S40 includes an insulating base 104 with two contacts 106 and 108 fixed to its upper surface. Contacts 106 and 108 are fabricated of conductive metal and have a series of interleaved fingers 110 which are spaced far enough apart to prevent dew or humid air from making a connection between the fingers 110 of the two contacts. However, the fingers are so spaced that, during periods of actual rainfall, the moisture accumulating on base 104 will bridge adjacent fingers 110 and close rain switch S40 by electrically connecting contact 106 to contact 108.

Fixed above contacts 106 and 108 is a rain diffuser and shield 112 fabricated of open mesh material (see FIG. 3). Shield 112 converts the drops of water impinging on it to a fine spray which covers contact fingers 110 and the spaces between them to provide a conductive path between contacts 104 and 106. Shield 112 is also a safety device, preventing inadvertent contact with contacts 104 and 106.

The operation of rain switch S40 can best be understood by reference to FIG. 4. The rain switch is connected in series with the coil H114 of relay R50 and the secondary S116 of stepdown transformer T56 by leads L118 and L120 in cable 69 and by leads L122, L124, and L126 in control unit 38. The primary P128 of transformer T56 is connected by external power cable 18, leads L86 and L92, timer contact S90, and leads L94, L132, L143, and L84 across the alternating current source 78. Thus, operating voltage appears across the rain switch when timer switch S90 is closed (i.e., during watering periods) and is removed from the switch when timer S90 is open. This minimizes the shock hazard at the rain switch.

When rain falls and closes rain switch S40, a relay energizing circuit is completed from transformer secondary S116 through lead L124, relay coil H114, leads L122 and L118, rain switch S40, and leads L120 and L126 back to the transformer secondary. Completion of this circuit and the energization of relay coil H114 opens normally closed relay contact NC96. This interrupts the continuity between leads L94 and L98 in the circuit provided to energize valve actuator H54, de-energizing the actuator. Consequently, valve 44 closes, interrupting the flow of water to sprinkler 14.

The relay energizing circuit just described remains completed as long as the rain continues, and no water will be supplied to sprinkler 14 while it is raining. However, as soon as the rain stops, the small amount of moisture remaining on the upper surface of rain switch base 104 quickly runs off and/or evaporates, opening the rain switch by interrupting the continuity between contacts 104 and 106. This interrupts the continuity between leads L118 and L120 in the relay energizing circuit, de-energizing relay R50 and returning its contact NC96 to the normally closed position, restoring continuity between leads L132 and L98 of the valve actuator energizing circuit.

If this occurs before the end of the watering period set into timer 46, timer contact S90 will be closed; operating voltage will again be applied to valve actuator H54 through the circuit described above; valve 44 will open; and sprinkling will resume, terminating at the end of the preselected period. However, if the rain does not cease until after the end of the preselected period, the timer will run its course and open timer contact S90. Consequently, the subsequent opening of rain switch S40 will not energize valve actuator H54; and valve 44 will remain closed until the next watering period.

There are a number of important advantages to the control circuit just described. Because of the novel planimetric construction described above, rain switch has an extremely fast reaction time; and it will close almost simultaneously with the beginning of a rain. Similarly, as only a small amount of moisture collects on the rain switch base and as the latter has a relatively large area, evaporation and run-off are very rapid when the rain stops. Therefore, sprinkling is resumed substantially coterminously with the cessation of the rain.

Planimetric switches are, in this regard, different from the heretofore employed volumetric type rain switches. For the reasons discussed in detail in parent application Ser. No. 272,793, planimetric switches are several times as sensitive as volumetric switches and the gap voltage can be much lower. This not only enables the control system to achieve far greater sensitivity, but also permits it to operate at lower voltages, which also reduces electrical shock hazard.

Further, as discussed above, fluid flowing onto the surface of a planimetric switch produces a practically instantaneous closing of the switch. A volumetric switch, in contrast, will close only after a finite and often considerable volume of fluid has accumulated.

Finally, the recovery time of the planimetric switching circuit is almost instantaneous. As soon as the switch opens it can again be closed. The fluid accumulated to close the switch must, in contrast, be drained away before the cycle can be repeated (and even before the switch will open) in a volumetric switching arrangement.

Another important, previously mentioned feature of my novel control as described above is the use of stepdown transformer T56 and sensitive relay R50 in series with rain switch S40 to control the continuity of the circuit to valve actuator H54. As rain switch S40 must be exposed to the atmosphere in order to operate effectively, safety considerations dictate that the operating voltage and flow of current be maintained as low as possible. Consequently, a transformer T56 is employed which will provide maximum coil resistance and minimum voltage and current in secondary S116 (shock hazard may also be reduced by making conduit 12 or conduit 16 or both electrically conductive, which will absolutely ground master control unit 38).

In addition to minimizing electrical shock hazards from the exposed rain switch, the just described transformer arrangement is also effective to prevent excitation transients across rain switch S40 which might otherwise result from collapsing magnetic fields in the coil H114 of relay R50 and in the coil of valve actuator H54.

Typically, transformer T56 will have a turns ratio of from 10:1 to 20:1 with resistance optimized for minimum current flow. This particular arrangement is, however, not critical and will vary depending upon the electrical characteristics of the remaining circuit components.

Referring still to FIG. 4, another important feature of control unit 38 is that it may be employed to control additional sprinklers 136 by using auxiliary, solenoid-operated valves 138. Again, it is a novel feature of the control unit that the auxiliary valves may be electrically coupled to the components in the flow control unit without gaining access to the interior of casing 42.

In particular, a socket or jack 140 accessible from the exterior of casing 42 (typically through bottom casing member 64) is connected across valve actuator leads L100 and L102 by leads L142 and L144. By coupling the auxiliary valve associated connector 146 to connector 140, the solenoid actuator H148 of the auxiliary valve 138 is connected in parallel with the actuator H54 of valve 44 through the leads L150 and L152 in external power cable 154. Thus, actuator H148 will be energized concomitantly with actuator H54, opening valve 138 and allowing fluid to flow to sprinkler 136 through supply conduit 158, valve 138, and distribution conduit 160 at the same time, and whenever, the fluid is flowing through valve 44 to sprinkler 14.

More than one auxiliary unit of the character just described may of course be operated by control 38, either by replacing the illustrated connector 140 with one to which plural, valve-associated connectors can be coupled or by fabricating the remote valves themselves so they can be connected in series or in parallel.

A further feature of control unit 38 is that it may also be employed to actuate other electrically operated devices such as rain warning alarms, booster pumps, liquid fertilizer distributing devices and the like. Units of this character are electrically coupled to the flow control system components housed in casing 42 in the same manner as the solenoid-operated valves 138 just described.

More specifically, a socket 162, also accessible from the exterior of casing 42, is connected across solenoid actuator leads L100 and L102 by leads L164 and L166. The auxiliary unit, here a booster pump 168, is connected into the control system by inserting a plug-type connector 170 in socket 162. This connects the pump to leads L164 and L166 through leads L172 and L174 in external cable 176. Thus, the pump will be energized and de-energized simultaneously with the solenoid actuator H54 of valve 44 so that the booster pump will operate while and whenever flow control valve 44 is open.

Again, simply by employing a different type of connector in place of socket 162, control unit 38 may be modified so that more than one auxiliary device may be operated in the manner just described.

In many applications of the present invention, the use of a rain switch such as described above will be desired. In such applications, the rain switch can, if wanted, be incorporated into the control unit rather than being made as a separate, detachable component. This of course requires that the control unit be in a location where rain can impinge on the switch. On the other hand, the alternate arrangement eliminates an external cable which may be desirable from the safety viewpoint, simplifies the control to some extent, and makes it more compact.

Figure 5:
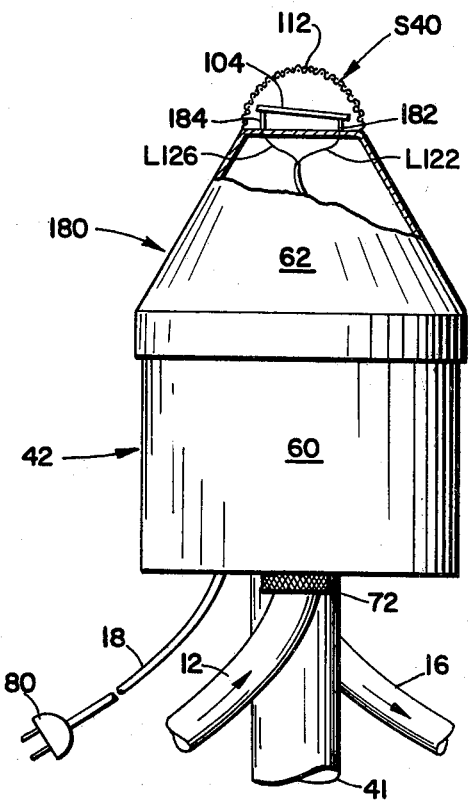
FIG. 5 is a second form of fluid flow system control unit in accord with the principles of the present invention.

Referring again to the drawing, FIGS. 1 and 5 depict a control unit, rain switch arrangement 180 of the character just described. To the extent that the components of this control unit are like those of control unit 38, they have been identified by the same reference characters.

In the alternate arrangement, rain switch S40 is mounted on the top of upper casing cover 62 by supports 182 and 184, preferably dimensioned so that the upper surface of rain switch base 104 will be inclined at a small angle to the horizontal. This ensures that any moisture on the base when rainfall ceases will rapidly run off and that switch S40 will therefore operate as a true planimetric switch.

External cable 69 is in this case unnecessary. Leads L122 and L126 are simply extended through cover 62 and connected to rain switch contacts 106 and 108, respectively. Because both the switch and these leads are isolated by rain switch diffuser, shield 112 and as there is only low voltage in the external circuit, the rain switch in this embodiment of the invention poses virtually no safety hazard.

In applications where a rain switch is not employed, the circuitry described above can be considerably simplified as neither a stepdown transformer nor a rain switch relay is necessary. A control unit of this character is illustrated in FIG. 6 and identified by reference character 190. Again, identical reference characters have been employed to identify components which are duplicates of those in control unit 38.

As shown in FIG. 6, all that need be present in the control unit casing in a flow control of the character just described are the solenoid-operated flow control valve 44, the clock type timer 46, the leads L84 and L86 of power cable 18, and leads L192 and L194. The latter connect the solenoid actuator H54 of valve 44 across leads L84 and L86 through timer contact S90 and lead L92.

The control system just described operates in the same manner as that illustrated in FIGS. 3 and 4 except there is no override of timer 46. Valve 44 opens when timer contact S90 closes and remains open until the contact reopens irrespective of the presence of precipitation, etc.

This embodiment of the invention has the advantage that there is only one external electrical cable. Therefore, by locating the control unit next to a socket or other power source to reduce the external cable to minimum length, electrical shock hazards can be virtually eliminated, particularly if the unit is grounded.

This unit also exhibits the advantages of simplicity, compactness, and low cost to the maximum.

However, versatility need not be sacrificed by eliminating the rain switch. Provision may be made for controlling auxiliary electrically operated devices through externally accessible connectors in the same manner as was described in conjunction with control unit 38.

Figure 7:
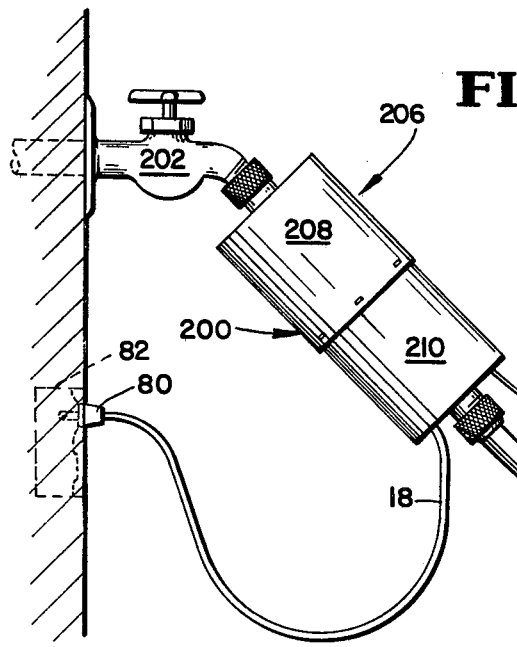
FIG. 7 is a third form of control unit embodying the principles of the present invention.

To the extent that this aspect of the invention has been referred to at all, the control units described above have been disclosed as being made for mounting on a stanchion or other support. This is of course unnecessary; and FIG. 7 depicts a control unit 200 which, instead, is designed to be supported by the faucet 202 constituting the source of fluid for sprinkler 204.

Referring now to the figure just mentioned, in which like reference characters have once more been employed to identify components which are duplicates of those described earlier, the electrical components of the flow control may be as described above and will accordingly not be discussed further.

The control unit casing 206 is a right cylinder consisting of upper and lower sections 208 and 210 with the upper section telescoped over the lower in the interest of keeping moisture from penetrating to the interior of the casing. Again, the casing may be hermetically sealed after the unit is assembled to make the penetration of foreign material to the casing interior virtually impossible.

In this embodiment of the invention, the control unit internal conduits 70 and 74 to and from the flow control valve extend through the ends of casing sections or members 208 and 210. This permits the control unit to be installed simply by threading connector 72 onto the end of faucet 202, connecting plug 80 to socket 82, and coupling the hose or other conduit 212 leading to sprinkler 204 to the coupling 76 extending through the lower end of the casing.

If it is to be employed, rain switch S40 is connected by plugging its external cable 69 into a socket such as that identified by reference character 66 in FIG. 4 and located in the bottom of control unit casing 206.

Any auxiliary devices to be operated by the control unit are similarly connected, the control unit timer is set, and the unit is ready for operation.

Again, as in the embodiments of the invention described previously, installation of the system is characterized by the ease and speed with which it may be accomplished and by the absence of any need for special skills or tools.

As indicated above, control units of the type disclosed herein may be employed for fluid flow control in a variety of applications other than lawn sprinkling. For example, by adding a level responsive control or substituting such a control for the rain switch, the control units of the present invention can be employed to regulate the liquid level in swimming pools, reservoirs, and other receptacles. They can also be employed to periodically open and close flood gates and to maintain such gates continuously open during periods of natural rainfall by controlling the flow of hydraulic fluid to the gate operators. In fact, those skilled in the arts to which the disclosure is directed will recognize that the flow controls described herein are in general applicable wherever regulation of fluid flow by time or time and an additional parameter or parameters is required.

This invention may of course be embodied in a variety of forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A flow control for a fluid flow system, comprising: a casing; a fluid flow valve having an electrically operated actuator in said casing; an electrically operated timer in said casing; valve operating means in said casing and including said timer for energizing and de-energizing the valve actuator to open and close the valve and thereby control the flow of fluid therethrough, said valve operating means further including a control device for overriding said timer which is adapted to be disposed exteriorly of said casing; means accessible from the exterior of said casing for connecting said valve operating means to an electrical power source; a stepdown transformer in said casing; means including external electrical conductors connecting the timer overriding control device to the associated components of the valve operating means through the low voltage side of said transformer, whereby only low voltage flows externally of said casing, said last-mentioned means also including an electrical connector accessible from the exterior of said casing, whereby the connection can be made without gaining access to the interior of said casing; connection means accessible from the exterior of the casing to which fluid supply and delivery means can be coupled; and means providing fluid communication between said connection means and the inlet and outlet of said fluid flow valve.

2. The flow control of claim 1, together with a relay in said casing, said relay having a contact in series with the actuator of the fluid flow valve and a coil in series with said timer overriding control device, whereby said coil will be energized to transfer said contact and interrupt the current to the actuator of the flow valve and cause said valve to close when electrical continuity is established in said control device.

3. The flow control of claim 2, wherein said timer overriding control device is a switch comprising an insulating member having a surface which is adapted to be oriented to receive rain thereon and first and second spaced apart conductor means on said surface and connected into said circuit means which are adapted to be electrically connected by precipitation on said insulating surface and thereby complete the continuity in said control device to thereby energize said relay and cause the fluid flow valve to close, said insulating member being so oriented that there is substantially no retention of water on said member after the cessation of the precipitation, whereby the continuity of said control device is completed and interrupted to respectively effect a closing of said valve substantially coterminously with the starting of the precipitation and a restoration of the control of said valve to the control of said timer substantially coterminously with the cessation of said precipitation.

4. A flow control for a fluid flow system as defined in claim 1 which the control device for overriding the timer includes an insulating base; means supporting said base at an inclination to the horizontal from the control unit casing; and first and second, spaced apart contact means on the upper side of said base which are adapted to be bridged by moisture accumulated on said base to complete an electrical circuit therebetween.

5. A flow control for a fluid flow system, comprising: a casing having a main member, a cover telescopically fitted over said main member at one end thereof; and a bottom cover fitted into and fixed to said main body member at the opposite end thereof; a fluid flow valve having an electrically operated actuator in said casing; an electrically operated timer in said casing; valve operating means in said casing and including said timer for energizing and de-energizing the actuator to open and close the valve and thereby control the flow of fluid therethrough, means accessible from the exterior of one of the casing components for connecting said valve operating means to an external electrical power source; connection means accessible from the exterior of said casing to which fluid supply and delivery means can be coupled; and means providing fluid communication between said connection means and the inlet and outlet of said fluid flow valve, the valve, timer, and valve operating means in said casing all being mounted on or supported from said bottom cover.

6. A flow control for a fluid flow system, comprising: a casing; a fluid flow valve having an electrically operated actuator in said casing; an electrically operated timer in said casing; valve operating means in said casing and including said timer for energizing and de-energizing the valve actuator to open and close the valve and thereby control the flow of fluid therethrough; means accessible from the exterior of said casing for connecting said valve operating means to an external electrical power source; an electrical connector means accessible from the exterior of the casing; means connecting said connector means in parallel with the actuator of the fluid flow valve, whereby, without requiring access to the interior of said casing, a further fluid flow controlling or effecting device can be coupled to said valve operating means for energization and de-energization of said device coterminously with the energization and de-energization of the fluid flow valve actuator; connection means accessible from the exterior of the casing to which fluid supply and delivery means can be coupled; and means providing fluid communication between said connection means and the inlet and outlet of said fluid flow valve.

7. A flow control unit for a fluid flow system, comprising: a casing having a main casing member, a top cover telescopically fitted over said main member at one end thereof, and a bottom cover fitted into and fixed to said main casing member at the opposite end thereof, said main casing member being a right circular cylinder in configuration, said top cover having a cylindrical portion and a frustoconical portion intersecting at a plane generally coincident with the end of the main casing member over which the cover is telescoped, and said bottom cover having a flat portion spanning said main casing member and a flange around the periphery of said flat portion abutting the interior of said main casing member; a fluid flow valve with an electrically operated actuator housed in said casing, said actuator being operable on the voltage available at an electrical power source located externally of said casing; valve operating means in said casing for energizing and de-energizing the valve actuator to open and close the valve and thereby control the flow of fluid therethrough, said valve operating means comprising a timer having a switch and switch operating means for opening and closing said switch in an automatically repetitive cycle; a single electrical conductor means extending from the interior to the exterior of said casing for connecting said valve operating means to said external electrical power source; conductors in said casing connecting said valve actuator to said conductor means in series with said switch and for connecting said conductor means to said switch operating means, manually manipulatable connection means disposed on the exterior side of said casing to which fluid supply and delivery means can be coupled; and means providing fluid communication from said connection means through said casing means to the inlet and outlet of said fluid flow valve.

8. A flow control unit for a fluid flow system, comprising: a casing which has a main casing member, a top cover telescopically fitted over said main casing member at one end thereof, and a bottom cover means forming a closure at the opposite end of the main casing member, said main casing member being a right circular cylinder in configuration, said top cover having a cylindrical portion and a frustoconical portion intersecting at a plane generally coincidental with the end of the main casing member over which the cover is telescoped, and said bottom cover means spanning said main body member; a fluid flow valve with an electrically operated actuator housed in said casing, said actuator being operable on the voltage available at an electrical power source located externally of said casing; valve operating means in said casing for energizing and de-energizing the valve actuator to open and close the valve and thereby control the flow of fluid therethrough, said valve operating means comprising a timer having a switch and switch operating means for opening and closing said switch in an automatically repetitive cycle; a single electrical conductor means extending from the interior to the exterior of said casing for connecting said valve operating means to said external electrical power source; conductors in said casing connecting said valve actuator to said conductor means in series with said switch and for connecting said conductor means to said switch operating means; manually manipulatable connection means disposed on the exterior side of said casing to which fluid supply and delivery means can be coupled; and means providing fluid communication from said connection means through said casing to the inlet and outlet of said fluid flow valve.

9. The flow control unit of claim 8, wherein said bottom cover means is a member fitted into and fixed to the main casing member and wherein the joints between the top cover and the main casing member and between the latter and the bottom cover means are hermetically sealed.

* * * * *